United States Patent [19]

Nomura et al.

[11] Patent Number: 5,251,288
[45] Date of Patent: Oct. 5, 1993

[54] FUZZY INFERENCE APPARATUS WITH MEMBERSHIP FUNCTION ADJUSTMENT

[75] Inventors: Hiroyoshi Nomura, Neyagawa; Isao Hayashi, Osaka; Noboru Wakami, Hirakata, all of Japan

[73] Assignee: Matsushita Electric Industrial Co., Ltd., Osaka, Japan

[21] Appl. No.: 750,120

[22] Filed: Aug. 26, 1991

[30] Foreign Application Priority Data

Sep. 3, 1990 [JP] Japan .................................. 2-233546

[51] Int. Cl.[5] ............................................. G06F 15/00
[52] U.S. Cl. ........................................ 395/51; 395/61; 395/900
[58] Field of Search ........................ 395/900, 61, 3, 51

[56] References Cited

U.S. PATENT DOCUMENTS

| | | | |
|---|---|---|---|
| 4,754,410 | 6/1988 | Leech et al. | 395/61 |
| 4,839,823 | 6/1989 | Matsumoto | 395/61 |
| 5,022,498 | 6/1991 | Sasaki et al. | 395/900 |
| 5,025,499 | 6/1991 | Inoue et al. | 395/10 |

FOREIGN PATENT DOCUMENTS 0373628 6/1990 European Pat. Off. .
0382490 8/1990 European Pat. Off. .
WO 90/01183 2/1990 PCT Int'l Appl. .

OTHER PUBLICATIONS

"Use of Simulated Annealing in Design of Very High Dimensioned Minimax Adaptive Controllers", A. Karimi et al., Conference Record of the Twenty-Third Asilomar Conference on Signals, Systems & Computers, vol. 1, Oct. 30, 1989, pp. 116–118.

"A Self-Tuning Method of Fuzzy Control by Descent Method", Hiroyoshi Nomura et al., Matsushita Electric Industrial Co., Ltd.

"Fuzzy Logic Simplifies Complex Control Problems", Tom Williams, Senior Editor, Computer Design, Mar. 1, 1991 pp. 90–102.

*Primary Examiner*—Allen R. MacDonald
*Attorney, Agent, or Firm*—Wenderoth, Lind & Ponack

[57] ABSTRACT

The fuzzy inference apparatus is provided to effect the tuning operation of the fuzzy inference with the use of the descent steps from the input/output data to be obtained from the specialists, the inputs of the users, and to automatically produce the desired fuzzy inference rules not by the trial and error, whereby the optimum inference rule can be obtained by the descent steps, and the specialists' knowledge and khow-how can be easily mounted on the appliances as the inference rules.

6 Claims, 14 Drawing Sheets

FUZZY INFERENCE APPARATUS WITH MEMBERSHIP FUNCTION ADJUSTMENT

BACKGROUND OF THE INVENTION

The present invention generally relates to a tuning technique of a fuzzy inference apparatus, and is adapted to automatically produce the inference rules of a fuzzy inference apparatus for satisfying desired specifications.

Generally, a computer implemented fuzzy inference operation is adapted to utilize knowledge obtained by human beings from the conventional experiences with the use of the inference rules in complicated control systems that mathematical models cannot describe.

FIG. 15 show the conventional fuzzy inference apparatus. The relation between the input information to be obtained from the control observation value input portion 101 such as a control deviation e and its variation factor $\Delta e$, and the operation amount u to be outputted from the control operation amount output portion 103 is described as an if - - - then . . . rule. A plurality of inference rules such as the one that follows are prepared and stored in a fuzzy inference rule memory portion 104.

IF e is Zero (ZO) and $\Delta e$ is Positive Small (PS)
Then u is Negative Small (NS).

Here, the if - - - portion is referred to as an antecedent part, and the then . . . portion is referred to as a consequent part. The Zero, Positive Small, Negative Small denote membership functions of the input and the output to be used in the description of the inference rules. The membership functions are accommodated in the membership function memory portion 105.

FIG. 16 shows one example of the membership functions. Each membership function is characterized by a symmetrical triangle.

NB (Negative Big), NS (Negative small), ZO (approximately zero), PS (Positive small), PB (Positive Big) and so on are often provided as the membership functions.

A fuzzy inference step to be processed in the fuzzy inference computing portion 102 will be described hereinafter. Suppose that such n inference rules as described hereinafter are accommodated in a fuzzy inference rule memory portion 104.

$R^1$: IF e is ZO and $\Delta e$ is PS
  THEN u is NS
$R^2$: IF e is ZO and $\Delta e$ is PB
  THEN u is PB
 .
 .
 .
$R^n$: IF e is NB and $\Delta e$ is ZO
  THEN u is NB where $R^i$ (i=1, 2, . . . n) is an inference rule.

A method of obtaining the membership value $\mu i$ of the antecedent part of the inference rule $R^i$ with respect to the input information e, $\Delta e$ will be described with a respect to a first rule $R^1$ by way of example. $\mu zo$ (e), $\mu ps$ ($\Delta e$) denote the membership values of the input information e, $\Delta e$ with respect to the membership functions ZO, PM of the front item proposition. Suppose that the eo, $\Delta eo$ have been inputted from the control observation value input portion 101 of FIG. 15, and the membership value $\mu^1$ of the rule $R^1$ is $$\mu 1 = \mu zo(eo) \wedge \mu ps (\Delta eo) \quad (1)$$

where $\wedge$ means a minimum operation.

The membership function $\omega 1$ of the conclusion of the consequent part of the interference rule $R^1$ is obtained as follows with the use of the membership value $\mu ns$ (u) of the membership functions NS of the rear item proposition.

$$\omega 1 = \mu 1 \wedge \mu ns(u) \quad (2)$$

As the inference rule $R^i$ is plural in number, the membership function connected with the membership function of all the conclusions is as follows.

$$u_T = \omega 1 V \omega 2 V \omega 3 V \ldots \quad V(3)$$

wherein V means a max operation.

Since the actual control operation amount uo is a real number although the membership function $u_T$ is the membership function of the conclusion showing the control operation amount, the membership function $u_T$ is required to be converted into a real value. A center of gravity shown hereinafter is adopted as the converting method. The control operation amount uo is as follows.

$$uo = (\delta u \cdot \mu_T du)/(\delta \mu_T du) \quad (4)$$

It is outputted into the control operation amount output portion 103 of FIG. 15.

However, in such a configuration as described hereinabove, it is difficult to effect optimum construction of the inference rules and the membership functions as described hereinafter.

The inference rules of the fuzzy inferences and the membership functions have to be decided so as to satisfy the desired control specification and the input/output relation. But a technique of automatically determining the inference rules and the membership functions is not established. Conventionally the fuzzy inference rules are designed by experiments through trial and error and the interviews with specialists. Therefore, the fuzzy inference devices have problems in that a longer design time is required and an optimum design is hard to achieve.

In such a configuration as described hereinabove, there are problems in that the inference rules and the membership functions are fixed so that they cannot follow the variations in the dynamic characteristics of the control object caused by variations in the control object value, and the functions of learning the likes, sensitivities and so on of the users cannot be realized.

SUMMARY OF THE INVENTION

Accordingly, an essential object of the present invention is to provide a fuzzy inference apparatus which is provided to effect a tuning (adjusting) operation of the fuzzy inference with the use of descent steps from the input/output data to be obtained from specialists, inputs of the users, and so on.

A fuzzy inference apparatus is provided with a fuzzy inference computing portion which is provided to effect the fuzzy inferences from the control input values and the observation values from the control object so as to output the operation amount with respect to the control object, an inference rule memory portion for storing the inference rules to be used in the fuzzy inference, a membership function memory portion for storing the geometric data of the membership functions of the antecedent part to be used in the inference rules and the functions of the consequent part, a descent steps computing portion which is provided to effect a computing operation by the descent steps from the input/output data given in advance and the output of fuzzy inferences to be obtained from the fuzzy inference computing portion, a membership function adjusting portion for varying at least one of the membership function of the antecedent part and the function of the consequent part according to the output of the descent steps computing portion, an error computing portion which is provided to compute the inference error from the input/output data and the output of fuzzy inferences to be obtained from the fuzzy inference computing portion and to stop the operation of the descent steps computing portion and the membership function adjusting portion when the inference error is smaller than a given value.

According to the above described construction, automatic tuning of the membership functions of the fuzzy inference can be effected. Concretely, with the use of the descent steps which is a type of nonlinear programming, the inference error which is the difference between the input/output data to be obtained from specialists and the output of fuzzy inferences and the membership functions is minimized.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
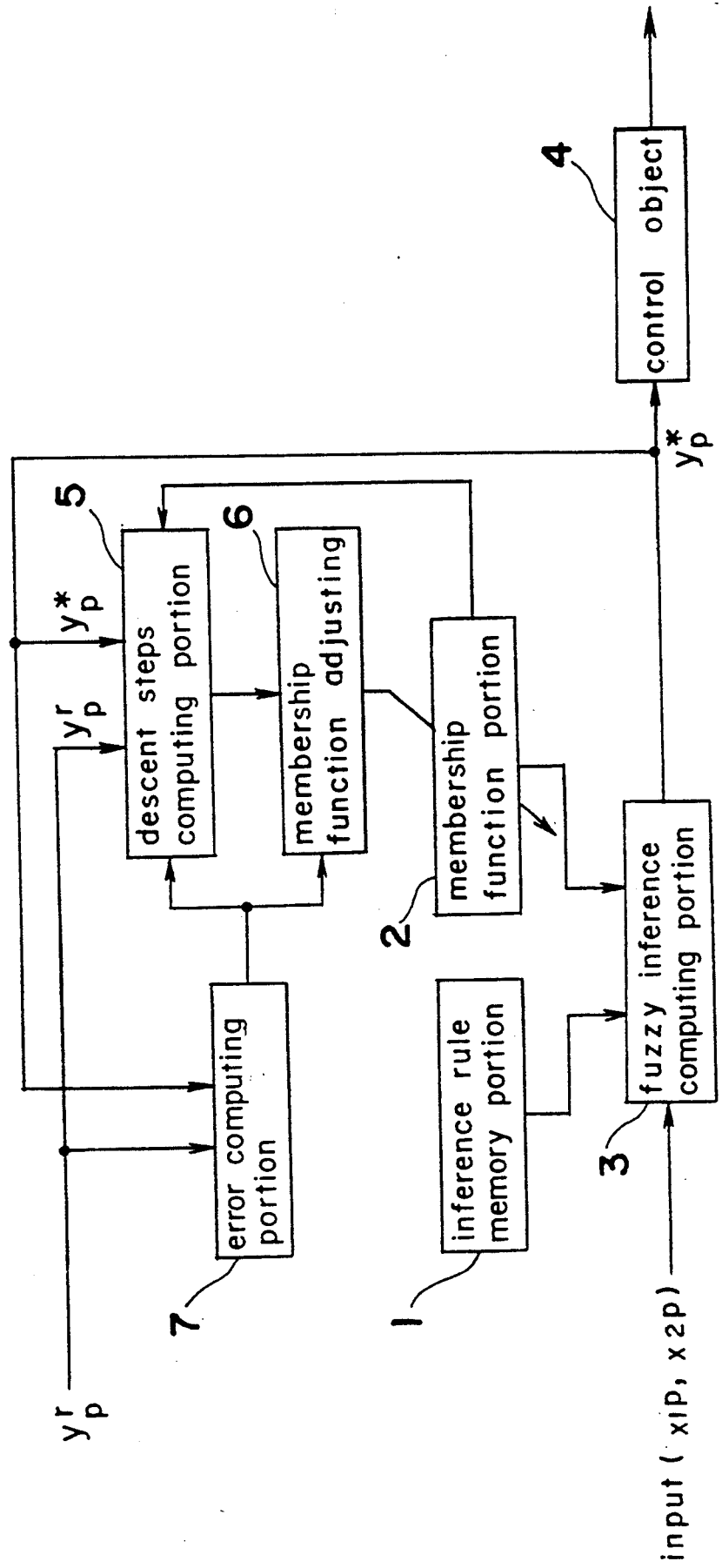
FIG. 1 is a block diagram of a fuzzy inference apparatus in a first embodiment of the invention.

Before the description of the present invention proceeds, it is to be noted that like parts are designated by like reference numerals throughout the accompanying drawings.

Referring now to the drawings, there is shown in FIG. 1, a block diagram of a fuzzy inference apparatus according to a first embodiment, which includes an inference rule memory portion 1 having the inference rules of the fuzzy inference stored therein, a membership function memory portion 2 having the geometric data of the membership functions of the antecedent part to be used in the fuzzy inference rules and the function formula of the consequent part stored therein, a fuzzy inference computing portion 3 for effecting the inference computing operation for the fuzzy inference, a control object 4, a descent steps computing portion 5 for effecting a computing operation using the descent method from the input/output data to be obtained from the specialists and the output of fuzzy inferences so as to obtain a tuning direction, a membership function adjusting portion 6 for renewing the parameters to be accommodated in the membership function memory portion 2 in accordance with the computation results of the descent method computing portion 5, and an error computing portion for computing the inference error from the output of fuzzy inferences of the fuzzy inference and the input/output data.

The operation of the fuzzy inference apparatus of the first embodiment will be described hereinafter.

Conventionally, the construction of the fuzzy inference rules and the membership functions are designed based on interviews with specialists and experiments by trial and error. Therefore, a longer time is required in the designing of inference rules, and an optimum design is hard to effect. In the present invention, the tuning (adjusting) of the fuzzy inference is automatically effected from the input/output data to be obtained from the specialists. Concretely, from input/output data gathered from specialists, the membership functions and fuzzy inference rules are automatically tuned by means of a descent method so as to minimize the inference error, which is the difference between the input/output data and the output of fuzzy reasoning. the descent method being a kind of nonlinear programming.

The detailed operation in the present embodiment will be described with the use of the flow chart of FIG. 2 in which a two-input one-output control system is used as an example.

Step a1

An initial setting of the inference rules and the input/output data number p are effected by the membership function adjusting portion 6.

The inference rule memory portion 1 has the following inference rules accommodated therein.

$R^1$: IF x1 = A11 and x2 = A12 THEN y = f1 (x1, x2)
$R^2$: IF x1 = A21 and x2 = A22 THEN y = f2 (x1, x2)
...
...
$R^n$: IF x1 = An1 and x2 = An2 THEN y = fn (x1, x2)

wherein i is an inference rule number, n is a total number of inference rules, Aij (i=1, ..., n, j=1,2) is a membership function of the antecedent part, fi (x1, x2) is a linear function of the consequent part.

Figure 3:
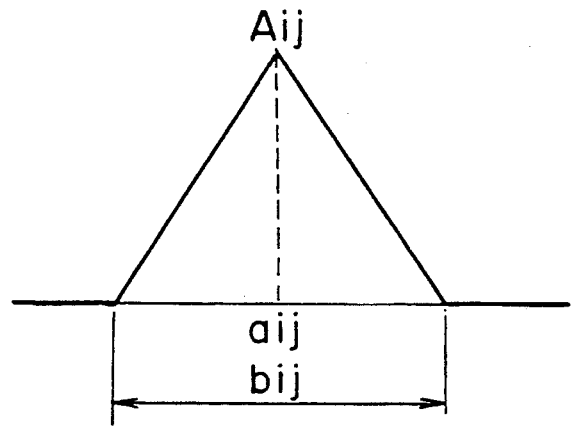
FIG. 3 is a construction view of a membership function.

The membership function Aij is assumed to be a isosceles triangle type as shown in FIG. 3, with the central value thereof being aij, and the width thereof being bij. Also, the linear function of the consequent part is $$fi(x1, x2) = pi \cdot x1 + qi \cdot x2 + ri \quad (5)$$

$$(i = 1, \ldots, n)$$

The parameters for tuning are aij, bij, pi, qi, ri. They are referred to as tuning parameters and are accommodated in the order of the inference rules in the membership function memory portion 2.

Although the membership function is assumed to be an isosceles triangle type in the present embodiment, similar effects may be obtained if it is a different shape. Also, the consequent part may be a nonlinear function or a membership function, instead of linear function.

An initial value of the central value aij of the membership function Aij of the antecedent part is set so that the domain of the input variable may be equally divided. An initial value of the width bij is made larger than the interval between the central values of the respective membership functions, and is set so that the respective membership functions may overlap one another. The coefficients pi, qi, ri of the linear functions of the consequent part are initiated at 0. Also, the input/output data number is initiated at 1.

Step a2

The input/output data (x1p, x2p, yp$^r$) to be obtained from the specialist are loaded. The data (x1p, x2p) are inputted into the fuzzy inference computing portion 3, and the data yp$^r$ is inputted into the descent method computing portion 5 and the error computing portion 7.

Step a3

The fuzzy inference is effected in the fuzzy inference computing portion 3 with the data (x1p, x2p) being provided as inputs. The computing operation to be expressed in the following formulas is effected it the fuzzy inference computing portion 3 so as to determine the operating amount yp$^*$ with respect to the control object 4.

$$\mu i = Ai1\ (x1p) \cdot Ai2\ (x2p) \quad (6)$$

$$yp^* = \frac{\sum_{i=1}^{n} \mu i \cdot fi}{\sum_{i=1}^{n} \mu i} \quad (7)$$

wherein ui is the membership value of the antecedent part of the inference rule R$^i$.

Step a4

At the step a4, in the descent method computing portion 5, the tuning direction of the tuning parameters aij, bij, pi, qi, ri are counted from the output of fuzzy inference yp$^*$ obtained at the step a3 and yp$^r$ inputted at the step a2. The objective function of the following formula is considered to be minimized as the target of the tuning of the membership functions.

$$E = \frac{1}{2} (Yp^* - Yp^r)^2 \quad (8)$$

The formula shows the difference between the output of fuzzy inference yp$^*$ and the data yp$^r$ obtained from the specialist, namely, the inference error. In the present invention, a membership function is produced automatically which minimizes inference error E.

In order to minimize the objective function E which is the inference error, the steepest descent method, which is one of descent method techniques, is used in the present embodiment. In the steepest descent method, the tuning parameters are renewed in accordance with the differential value of the objective function.

Figure 4A:
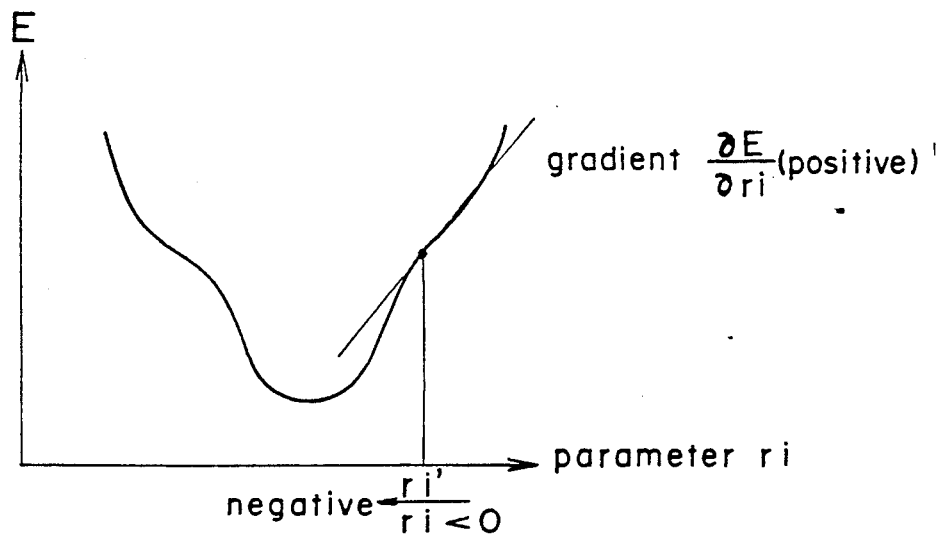
FIGS. 4(a) and (b) are movement illustrating charts of descent steps.
Figure 4B:
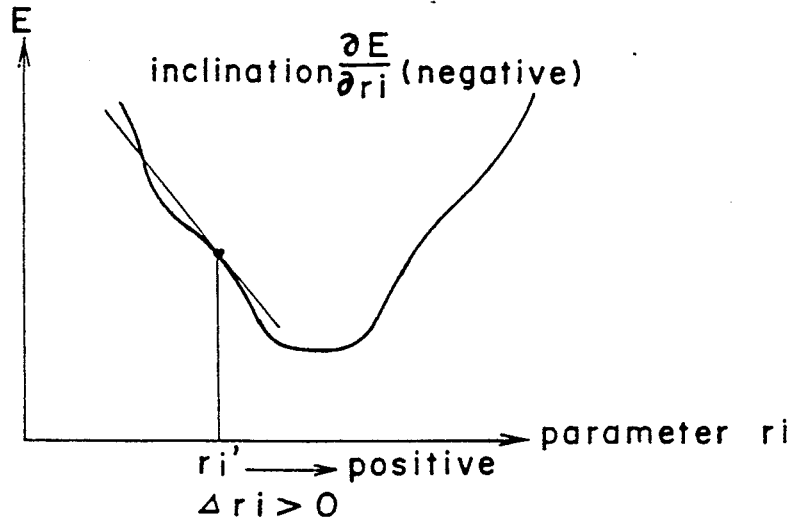

A differential value ∂E/∂ri on the tuning parameter ri of the objective function E is taken into consideration. FIG. 4 shows an objective function E with the axis of abscissas as ri. The differential value ∂E(ri')/∂ri means the gradient of the objective function in the ri' point as shown in FIG. 4. FIG. 4(a) shows when the value ∂E(ri')/∂ri is positive. FIG. 4(b) shows when the value ∂E(ri')/∂ri is negative.

Here the objective function E is reduced when the tuning parameter ri is moved slightly in the direction opposite to the sign of the value ∂E(ri')/∂ri as shown by an arrow of FIG. 4(a). Similarly, the effect of the micro-amount adjustment of the tuning parameter in the direction opposite to the sign of the value ∂E(ri')/∂ri even when the value ∂E(ri')/∂ri of FIG. 4(b) is negative, and the objective function E is reduced. Namely, adjust the tuning parameter ri in the direction opposite to the sign of the differential amount ∂E/∂ri, and the objective function E is reduced. By repetition, the objective function E is converged into a minimum value. In such a manner, the tuning of each parameter is effected. At the step a4, the gradient values are counted in the descent method computing portion 5, and, at the step a5, the parameters aij, bij, pi, qi, ri are tuned in accordance with the gradient values using this algorithm.

Here ∂E/∂ri is obtained. From the formulas (7), (8), $$\frac{\partial E}{\partial ri} = \frac{\partial}{\partial ri} \left( \frac{1}{2} (yp^* - yp^r)^2 \right) = \quad (9)$$

$$\mu i \cdot (yp^* - yp^r) \cdot \left( \sum_{i=1}^{n} \mu i \right)^{-1}$$

the numerical computing operation is effected from the formula (9) so as to obtain the value of ∂E/∂ri.

Similarly, by the computing operation of ∂E/∂aij, ∂E/∂bij, ∂E/∂pi, ∂E/∂qi, ∂E/∂ri, the adjusting direction for reducing the objective function is counted. The counting operation of these ∂E/∂ai, ∂E/∂bi, ∂E/∂pi, ∂E/∂qi, ∂E/∂ri is effected in the descent steps computing portion 5.

Step a5

In the membership function adjusting portion 6, the tuning parameters aij, bij, pi, qi, ri which are accommodated in the membership function memory portion 2 are renewed with the use of ∂E/∂aij, ∂E/∂bij, ∂E/∂pi, ∂E/∂qi, ∂E/∂ri obtained in step a4.

The renewing operation is effected by the following formula.

$$aij \leftarrow aij - Ka \cdot \frac{\partial E}{\partial aij} \quad (10)$$

$$bij \leftarrow bij - Kb \cdot \frac{\partial E}{\partial bij} \quad (11)$$

$$pi \leftarrow qi - Kp \cdot \frac{\partial E}{\partial pi} \quad (12)$$

$$qi \leftarrow qi - Kq \cdot \frac{\partial E}{\partial qi} \quad (13)$$

$$ri \leftarrow ri - Kr \cdot \frac{\partial E}{\partial ri} \quad (14)$$

$(i = 1, \ldots, n, j = 1, 2)$ wherein Ka, Kb, Kp, Kq, Kr are constants.

Step a6

At the step a6, the input/output data number p is compared with the total number N of the input/output data. When the input/output data number p is smaller than the total number N of the input/output data, the value of p is increased by 1 in the step a7, and the process returns to the step a2 so as to repeat the steps a2 to a7 until the data number p becomes equal to the total number N of the input/output data. If the input/output data number p is larger than the total number N of the input/output data, the process advances to the step a8.

Step a8

At the error computing portion 7, the inference error D and its variation amount ΔD are counted. The inference error D is computed with the use of the following formula.

$$D = \frac{1}{N} \sum_{p=1}^{N} (yp^* - yp^r)^2 \quad (15)$$

The variation amount ΔD is counted by the following formula.

$$\Delta D = D(t) - D(t-1) \quad (16)$$

wherein t is the iteration number of the tuning, and ΔD is the difference between the inference error at the previous tuning time and the present inference error.

Step a9

At the error computing portion 7, the variation amount ΔD of the inference error is compared with the given threshold value T. If the variation amount ΔD is larger then the given threshold value T, the process moves to a step a10, and the input/output data number p are set at 0 so as to repeat the steps a2 to a8. If the variation amount ΔD is smaller than the given threshold value T, the inference error has been converged, and the error computing portion 7 stops the operations of the descent method computing portion 5 and the membership function adjusting portion 6 to complete the tuning operation.

At the completion time of the tuning operation, the knowledge of the specialist is expressed by the inference rules in the inference rule memory portion and the membership function memory portion 2.

According to the present embodiment, the optimum inference rules may be obtained by the descent method from the input/output data to be gathered from the specialist. Therefore, the knowledge and the know-how of specialists may be easily mounted on the appliance by the use of the inference rules obtained.

In the embodiment, the steepest descent method is used as the descent method of the descent method computing portion 5. The Newton method, a conjugate gradient method, the Powell method and so on may also be used. Although the completion judgement of the tuning is effected by the value of the inference error in the error computing portion 7, a technique of setting the iteration number of the tuning in advance may be used.

Figure 5:
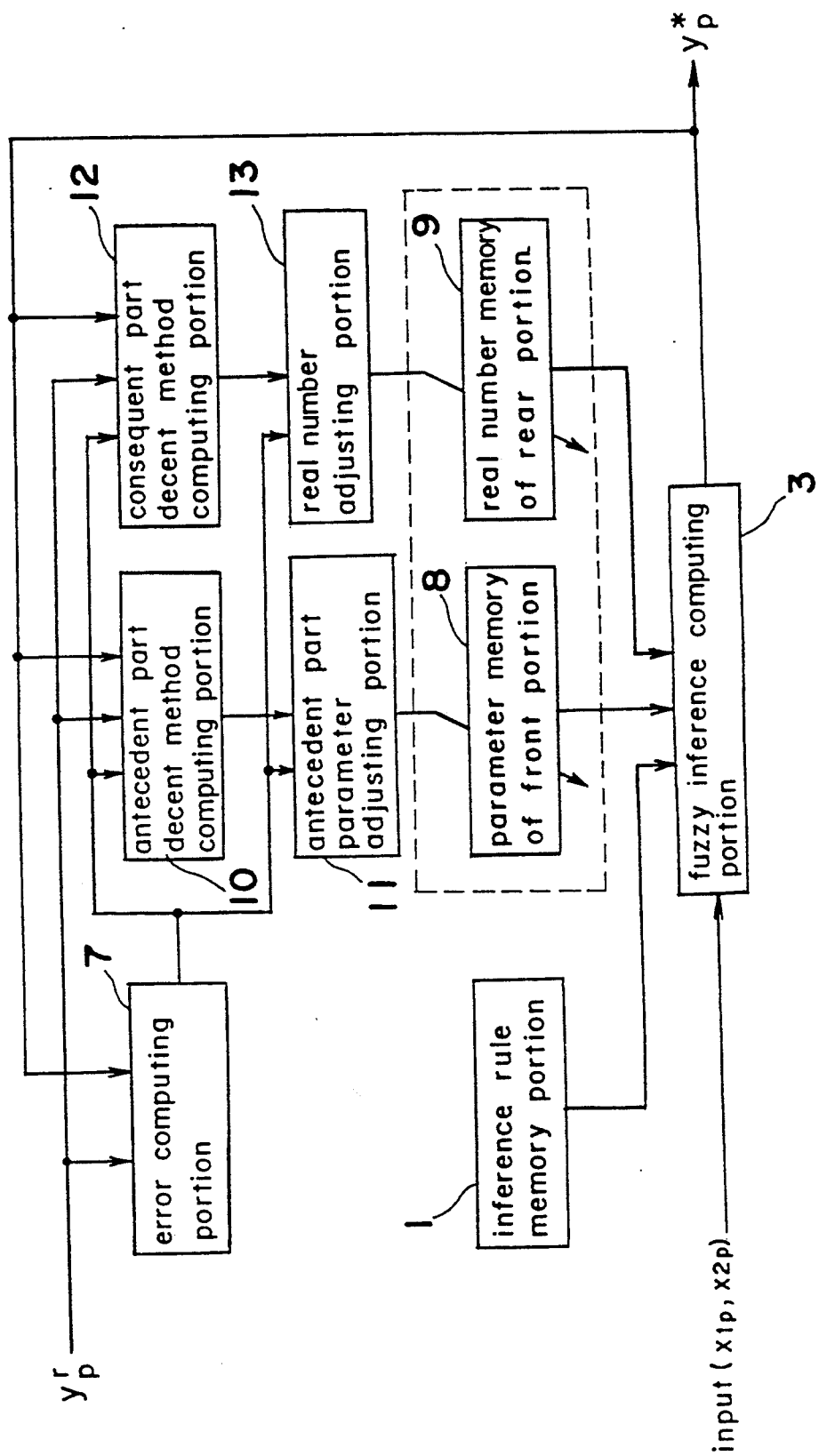
FIG. 5 is a block diagram of a fuzzy inference apparatus in a second embodiment of the invention.

The second embodiment of the invention will be described hereinafter. The block diagram of the fuzzy inference apparatus of a second embodiment is shown in FIG. 5. In FIG. 5, reference numeral 1 is an inference rule memory portion having the fuzzy inference rules stored therein, reference numeral 3 is a fuzzy inference computing portion for effecting the inference computing operation of the fuzzy inference, reference numeral 7 is an error computing portion for computing the inference errors from the fuzzy output of fuzzy inferences and the input/output data, which are similar in construction to that of FIG. 1. The construction difference between FIG. 5 and FIG. 1 is that FIG. 5 has an antecedent part parameter memory portion 8 for accommodating the parameters showing the geometry of the membership functions of the antecedent parts, a consequent part real number memory portion 9 for accommodating the real values of the consequent part, an antecedent part descent method computing portion 10 for obtaining the tuning direction of the membership function of the antecedent part using a descent method from the input/output data and the output of fuzzy inferences to be obtained from the specialists, an antecedent part parameter adjusting portion 11 for renewing the membership function of the antecedent part in accordance with the operation results of the antecedent part descent method computing portion 10, a consequent part descent method computing portion 12 for obtaining the tuning direction of the real value of the consequent part by the computing operation of the descent method from the input/output data obtained from the specialists, and a consequent part real number adjusting portion 13 for renewing the real numbers of the consequent part in accordance with the computing results of the consequent part descent method computing portion 12.

The operation of the fuzzy inference apparatus of the second embodiment will be described hereinafter.

The present invention is provided to automatically tune the membership functions of the antecedent part of the fuzzy inference rules and the real numbers of the consequent part from input/output data to be obtained from the specialists.

Figure 6:
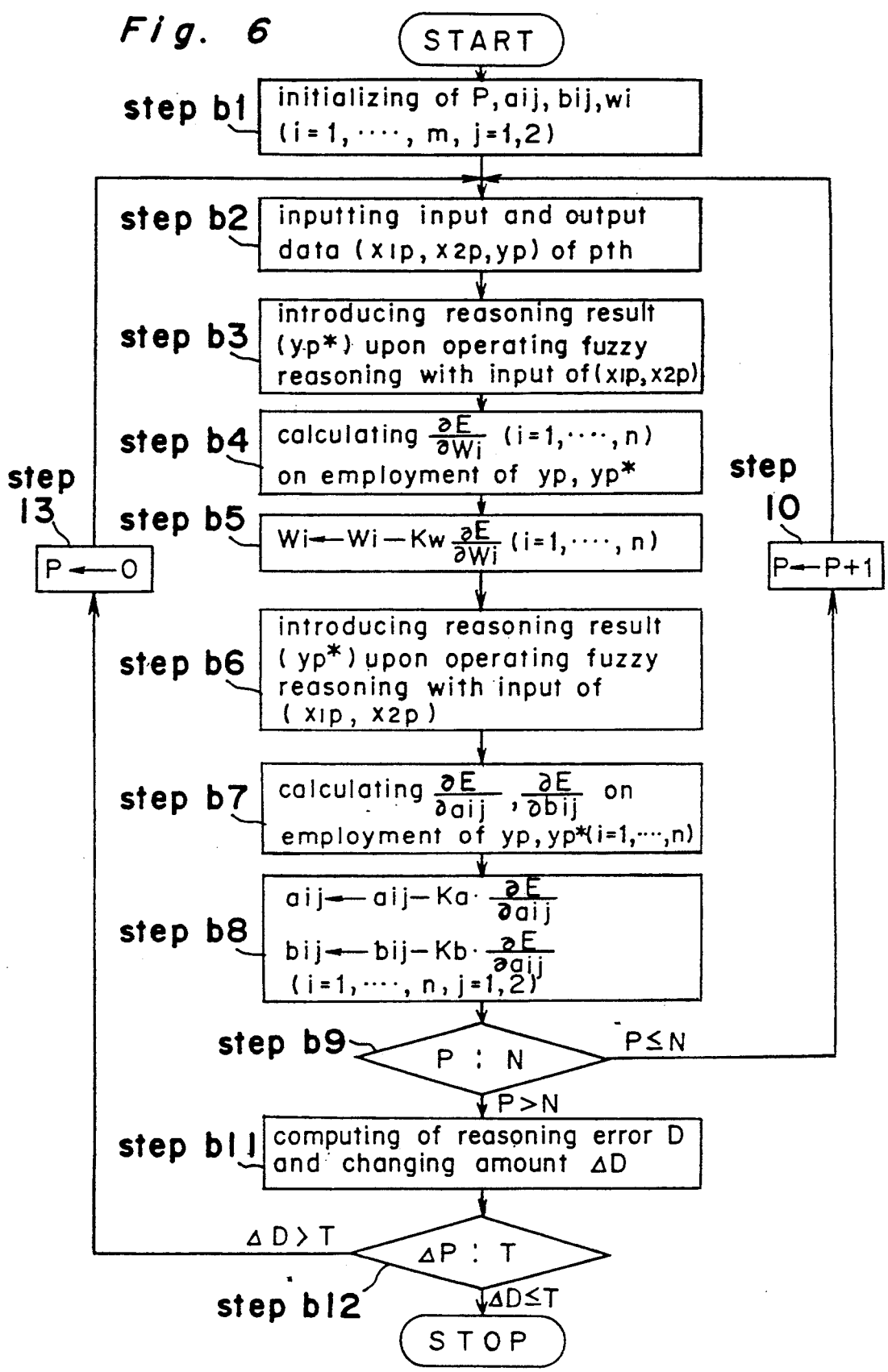
FIG. 6 is a flow chart showing the operation of the embodiment.

The detailed operation of the present embodiment will be described hereinafter with the use of the flow chart of FIG. 6 in which a two-input one-output control system is used as an example.

Step b1

By the antecedent part parameter adjusting portion 11 and the rear item real number adjusting portion 13, the real numbers of the membership function of the antecedent part and the real number of the consequent part are initially set. At this time, the initial setting operation of the input/output data number p will be also effected.

The following inference rules are accommodated in the inference rule memory portion 1.

$R^1$: IF $x1 = A11$ and $x2 = A12$ THEN $y = w1$
$R^2$: IF $x1 = A21$ and $x2 = A22$ THEN $y = w2$
...
$R^2$: IF $x1 = An1$ and $x2 = A22$ THEN $y = wn$ wherein i is an inference rule number, n is a total number of inference rules, Aij (i=1, ..., n j=1, 2) is a membership function of the antecedent part, wil (i=1, ..., n) is a real number of the rear item case portion.

The membership function in the antecedent part is an isosceles triangle which is similar to that in a first embodiment, with the values of the central value aij thereof and the value of the width bij thereof being accommodated, in the order of the inference rules, in the antecedent part parameter memory portion 8.

The initial value of the central value aij of the membership function Aij in the antecedent part is set so as to equally divide the domain of the input variables. An initial value of the width bij is assumed to become larger than the interval between the central values of the respective membership functions so as to be set so that the membership functions may overlap one another.

The real number wi of the consequent part is accommodated, in the order of the inference rules, in the consequent part real number memory portion 9, with the value thereof being kept initially at 0.

Step b2

The input/output data (x1p, x2p, yp$^r$) to be obtained from the specialists are inputted. The data (x1p, x2p) is inputted into the fuzzy inference computing portion 3, and the data yp is inputted into an error computing portion 7, the antecedent part descent method computing portion 10, and the consequent part descent method computing portion 12.

Step b3

By the use of the data (x1p, x2p) inputted at the step b2, the fuzzy inference is effected by the fuzzy inference computing portion 3. The fuzzy inference computing portion 3 effects the computing operation shown by the following formula so as to determine the operation amount yp$^*$ with respect to the control object.

$$\mu i = Ai1 \ (x1p) \cdot Ai2 \ (x2p) \tag{17}$$

$$yp^* = \frac{\sum_{i=1}^{n} \mu i \cdot wi}{\sum_{i=1}^{n} \mu i} \tag{18}$$

wherein $\mu i$ is a membership value of the antecedent part of the inference rule $R^i$.

Step b4

From the output of fuzzy inference yp$^*$ obtained at the step b3 and data yp$^r$ inputted at the step b2, the tuning direction $\partial E/\partial wi$ of the real number wi in the consequent part is obtained by the steepest descent method in the consequent part descent method computing portion 12 as in the first embodiment. E is an objective function of the (8) formula. The computing method is similar to the first embodiment.

Step b5

At a step b5, with the use of the value $\partial E/\partial wi$ computed at the step b4, the tuning parameter wi accommodated in the consequent part real number value memory portion 9 is renewed by the consequent part real number adjusting portion 13.

The renewing operation is effected in accordance with the following formula.

$$wi \leftarrow wi(t) - Kw \cdot \frac{\partial E}{\partial wi} \tag{19}$$

$$(i = 1, \ldots, n)$$

wherein Kw is a constant.

Step b6

Fuzzy inference is effected again with a similar procedure to that of the step b3.

Step b7

From the output of fuzzy inference yp$^*$ obtained at the step b6 and the data yp$^r$ inputted at the step b2, the tuning direction ($\partial E/\partial aij$, $\partial E/\partial bij$) of the parameters aij, bij in the antecedent part is computed.

Step b8

With the use of the value ($\partial E/\partial aij$, $\partial E/\partial bij$) computed at the step b7 by the antecedent part descent method computing portion 10, the tuning parameters aij, bij accommodated in the antecedent part parameter memory portion 8 are renewed. The renewing operation is effected in accordance with the following formula.

$$aij \leftarrow aij - Ka \cdot \frac{\partial E}{\partial aij} \tag{20}$$

$$bij \leftarrow bij - Kb \cdot \frac{\partial E}{\partial bij} \tag{21}$$

$$(i = 1, \ldots, n \ j = 1, 2)$$

where, ka, kb are constants.

Step b9

The input/output data number p is compared with the total number of the input/output data. If the input/output data number p is smaller than the total number N of the input/output data, the process goes to a step b10 to increase the value of p by one, and returns to the step b2 and repeats the steps b2 to b8 until the data numeral p becomes equal to the total number N of the input/output data. If the input/output data number p is larger than the total number N of the input/output data, the process moves to a step b11.

Step b11

The inference error D and its variation amount $\Delta D$ are computed by the error computing portion 7. The inference error D and its variation amount $\Delta D$ are computed with the use of the formulas (15), (16) as in the first embodiment.

Step b12

By the error computing portion 7, the variation amount $\Delta D$ of the inference error is compared with the given threshold value T. If the variation amount $\Delta D$ is larger than the given threshold value T, the process moves to the step b13 so as to initiate the input/output data number p at 0, and repeats the steps b2 to b11. If the variation amount ΔD is smaller than the given threshold value T, the tuning is completed with the error being converged.

At the tuning completion, the inference rules with the knowledge by the specialists being loaded therein are constructed in the inference rule memory portion 1 and membership function memory portion 2.

According to the present embodiment, the optimum inference rules may be obtained, by the descent method, from the input/output data to be obtained from the specialist. As the consequent part of the inference rule is real numbers, the number of the tuning parameters is less, and automatic tuning at a higher speed than in the first embodiment can be effected. Thus, by the use of the present invention, the knowledge and know-how of the specialists can be easily mounted on the appliance as the inference rules. In a second embodiment, the geometry of the membership functions in the antecedent part is made a triangle type, but may instead be other shapes. Although the descent steps used by the antecedent part descent method computing portion 10 and the consequent part descent method computing portion 12 is the steepest descent method, it may be the Newton method, a conjugate gradient method, the Powell method, or the like. In the present embodiment, the membership functions in the antecedent part and the real numbers in the consequent part can be tuned at the same time, but one of them can be used.

Figure 7:
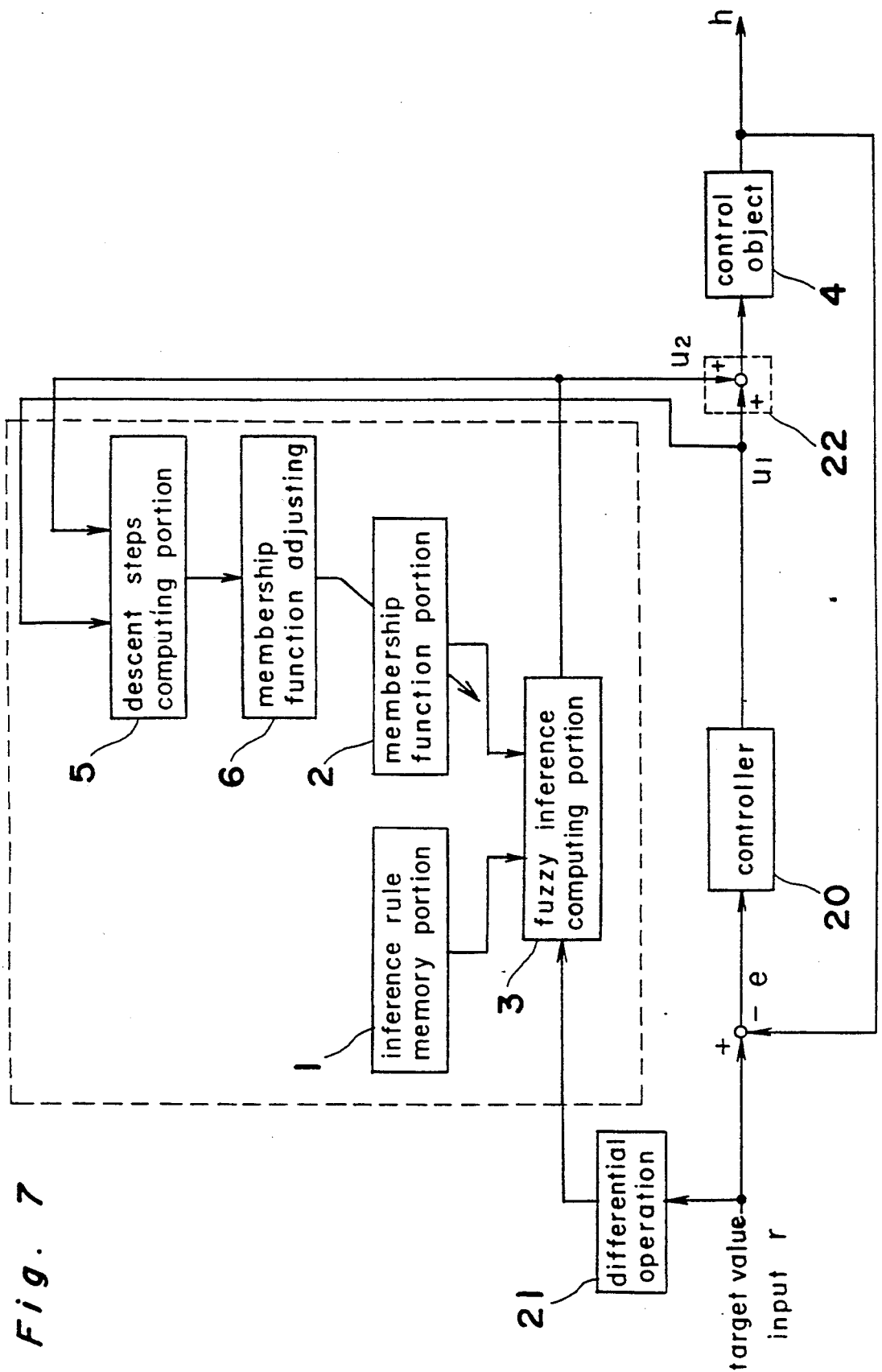
FIG. 7 is a block diagram of a fuzzy inference apparatus in a third embodiment of the invention.

The third embodiment of the invention will be described. FIG. 7 shows a block diagram of the fuzzy inference apparatus of a third embodiment. Referring now to FIG. 7, reference numeral 1 is an inference rule memory portion having the fuzzy inference rules stored therein, reference numeral 2 is a membership function memory portion having the membership functions to be used in the fuzzy inference rules and the function formula in the consequent part stored therein, reference numeral 3 is a fuzzy inference computing portion for effecting the inference computing operation of the fuzzy inference, reference numeral 4 is a control object, reference numeral 5 is a descent steps computing portion for obtaining the tuning direction through the computing operation by the descent method, reference numeral 6 is a membership function adjusting portion for renewing the membership functions in accordance with the computation results of the descent steps computing portion 5. The above description is similar in construction to FIG. 1. The difference between FIG. 7 and FIG. 1 is that FIG. 7 has a controller 20 for outputting the operation amount for the control object 4 from the difference between the input and the observation value, a differential computing portion 21 for differentiating the input variables, and an operation amount adding portion 22 for adding the output of the controller 20 and the output of the fuzzy inference rule computing portion 3.

The operation of the third embodiment will be described hereinafter.

Conventionally, in a control object where a nonlinear property, inference and so on shown as in, for example, a multiple indirect manipulator cannot be neglected, it is difficult to follow the changes in the target value using only normal feedback control. In order to solve such problems, a feed forward control is proposed. But in order to design the control system using the feed forward control, the constituting elements of an inverse dynamic model of the control object are required to be completely known, thus resulting in a difficult designing operation.

The present invention automatically obtains the inverse dynamic model of the control object in the form of the fuzzy inference rule so as to effect the optimum feed forward controlling operation.

The present embodiment will be described hereinafter in detail using a one-input one-output control system as an example.

The controller 20 is to have only a proportional computing operation in the present embodiment. In the controller 20 with a target value being r(t), an observation value from a control object being h(t), such a computing operation as described in the following formula will be described.

$$e(t) = r(t) - h(t) \tag{22}$$

$$u1(t) = k \cdot e(t) \tag{23}$$

wherein u1 is an operation amount of a control object 4, t is time, k is a proportional constant.

The observation value h is as follows.

$$h = G(u1 + u2) \tag{24}$$

Where the transfer function of the control object is G. Here the value u2 is a feed forward amount. The adding operation of u1 and u2 is effected in the operation amount adding portion 22.

A portion of effecting the feed forward computing operation surrounding by dotted lines of FIG. 7 is similar in construction to the first embodiment.

Accordingly, the portion within the dotted lines, if certain input/output data are given, constructs the fuzzy inference rules which satisfy the input, output relation sufficiently. In the embodiment, the input/output data are set as follows.

Input data: target value r and its differential amount dr/dt

Output data: operation amount (u1) with respect to a control object

When the target value r and the differential amount dr/dt are inputted by the setting operation in this manner, the inference rules for outputting the operation amount u1 are obtained. The input/output relation of inference rules is reversed to the control object for outputting the observation amount when the operation amount u1 is inputted, and the inference rules to be produced is an inverse dynamic model of the control object. The differential amount dr/dt of a target value r which is one of the input data is obtained by the differential computing portion 21.

The difference from the first embodiment in the construction within the dotted lines is in that the error computing portion does not exist. In the first embodiment, the error computing portion computes the variation amount of the inference error so as to determine the completion of the tuning from the value.

The present embodiment is an adaptive control where it is normally caused to follow the changes of the control object. Therefore, as the tuning is normally required, the completion decision is not required.

Figure 8:
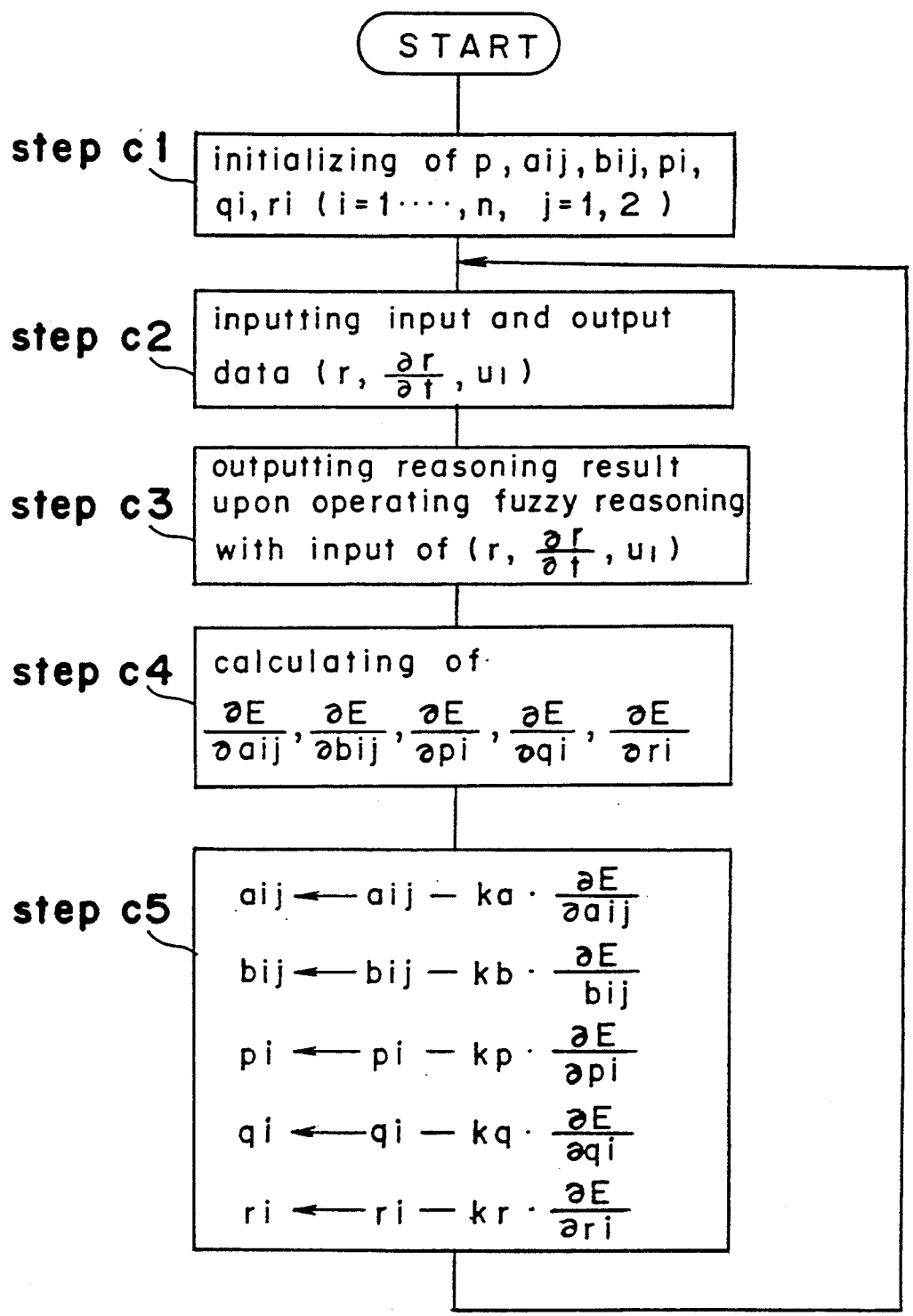
FIG. 8 is a flow chart showing an operation of the embodiment.

The algorithm of the tuning is shown as in FIG. 8. The step c1 through c5 are the same as the step a1 to step a5 in FIG. 2. The difference between them is that there is no completion decision and branching by the data number in the step a6 and subsequent steps of FIG.

2. In the present embodiment, the repetition is effected from the step c1 to step c5.

By the proper selection of the input/output data, the inverse dynamic model of the control object is automatically obtained.

For some time from the tuning start time, the membership function of the antecedent part and the linear function of the consequent part to be accommodated in the membership function memory portion 2 are not converged into the optimum values, with the value near the initial value being outputted to u2. Accordingly, the control object is controlled mainly by the controller 20. The variation of the control object caused by the change of the target value cannot be followed. As time passes, the tuning of the fuzzy inference advances to learn the inverse dynamic model of the control object. The variation of the control object may be also followed sufficiently.

According to the present embodiment, the following operation may be effected with respect to the changes in the target value, even in the difficult control object where the control object has nonlinear characteristics and the interferences cannot be neglected, by the use of the fuzzy inference in the feed forward control and by the use of the descent method in the tuning thereof.

In a third embodiment, the controller 20 has a proportional control only, with the other controller such as PID control and so on being used. Although the differential computing portion 21 is to output one order differentiation only of the input value, it may output together with the differential value of a high order. The construction of a portion where the automatic tuning operation is effected is made similar to that of the first embodiment, and the construction of the second embodiment may be used in the portion. In this case, the consequent part of the inference rules becomes real numbers, thus realizing the merit of the second invention in which the tuning is effected at a higher speed.

A fourth embodiment will now be described.

Figure 9:
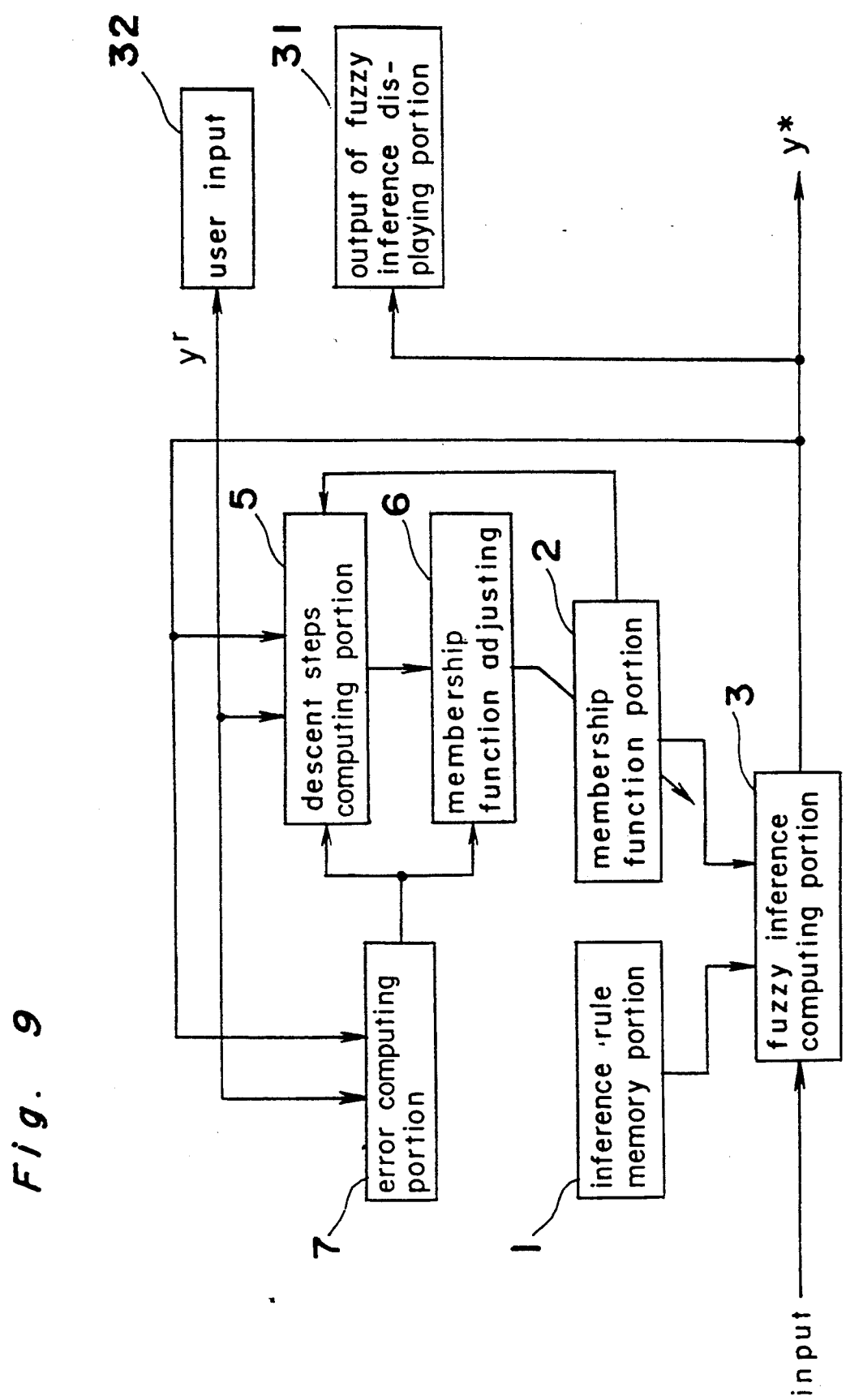
FIG. 9 is a block diagram of a fuzzy inference apparatus in a fourth embodiment of the invention.

Referring now to the drawings, there is shown in FIG. 9, a block diagram of a fuzzy inference apparatus according to a fourth invention, which includes an inference rule memory portion 1 having the inference rules of the fuzzy inference stored therein, a membership function memory portion 2 having the geometric data of the membership functions of the antecedent part to be used in the fuzzy inference and the function formula of the consequent part stored therein, a fuzzy inference computing portion 3 for effecting the computing operation of the fuzzy inference, a descent method computing portion 5 for obtaining the tuning direction by the descent method computing operation from the input/output data to be obtained from the specialists and the output of fuzzy inference so as to obtain the tuning direction, a membership function adjusting portion 6 for renewing the membership functions in accordance with the computing results of the descent steps computing portion 5, and an error computing portion 7 for computing the inference errors from the fuzzy output of fuzzy inferences and the input/output data. The above description is similar to the construction of FIG. 1. The difference from the construction of FIG. 1 is that FIG. 9 has the output of fuzzy inference displaying portion 31 for displaying the output of fuzzy inferences computed by the fuzzy inference computing portion 3 and the user input portion 32 for inputting the preferences of the user with respect to the output of fuzzy inferences.

The operation of the fuzzy inference apparatus in the fourth embodiment will be described hereinafter.

In order to realize an appliance where the likes and sensitivities of the individual users are learned and the controls suitable for the likes of the users are effected as it is used more, the control algorithm must be changed gradually using the inputs of the users as study data. In the present invention, by the loading of the user inputs, the fuzzy inference rules are gradually tuned so as to realize the controls which are suitable for the likes and sensitivities of the users. This is an adaptive fuzzy control which is adapted to learn the likes of the users in real time.

In order to describe more concretely the operation of the present embodiment, the inference of the washing time in a washing machine will be described by way of example.

In a fully automatic washing machine and so on, the washing time is decided by changes in the transmission factor of the washing water to be detected by an optical sensor and its saturation time. The relation will be described as the following fuzzy inference rules if the washing time, the changes in the transmission factor of the washing water, and the saturation time in the transmission factor of the washing water are shown respectively as y, x1, x2.

$$R^1: \text{IF } x1 = A11 \text{ and } x2 = A12 \text{ THEN } y = f1 (x1, x2)$$
$$R^2: \text{IF } x1 = A21 \text{ and } x2 = A22 \text{ THEN } y = f2 (x1, x2)$$
$$\ldots$$
$$R^n: \text{IF } x1 = An1 \text{ and } x2 = An2 \text{ THEN } y = fn (x1, x2)$$

Figure 10:
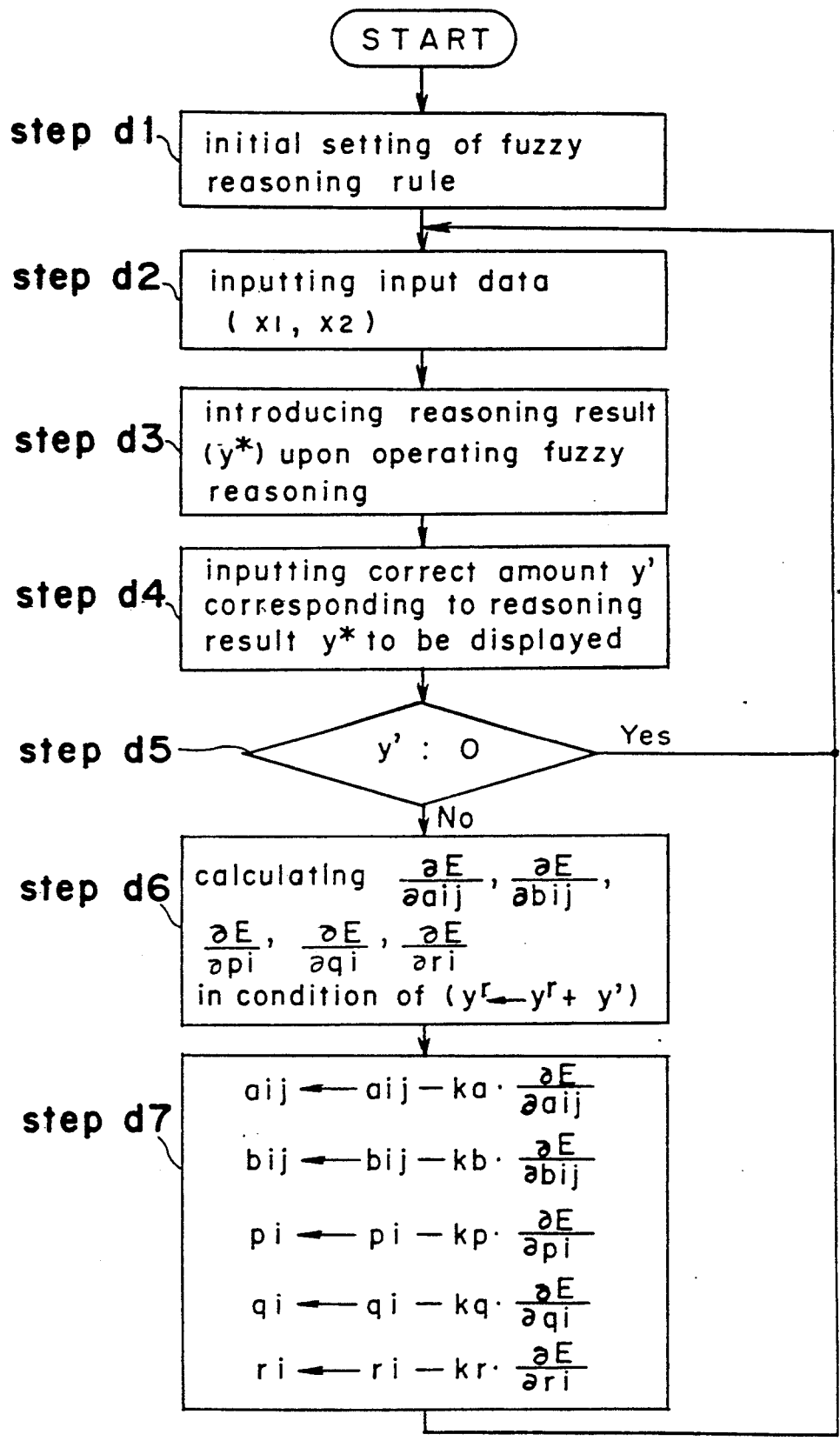
FIG. 10 is a flow chart showing an operation of the embodiment.

It is considered that these inference rules are gradually learned in accordance with the likes of the users. The operation of the present embodiment will be described with the flow chart of FIG. 10.

Step d1

The initial setting operation of the fuzzy inference rules, the membership functions of the antecedent part, the real numbers of the consequent part accommodated in the inference rule memory portion the membership function memory portion 2. In the washing machine, the standard inference rules are set before shipment, so that the proper washing time may be obtained even in the inference rule only. This is because the washing operation may be effected sufficiently even in the condition where the learning is not effected. In the construction of the initial inference rules, the first embodiment may be used and the experiments by trail and error and interviews with specialists may be used as before.

Step d2

At the start of the washing operation, the input data are loaded into the fuzzy inference computing portion 3. The changes x1 and the saturation time x2 in the transmission factor of the washing water to be detected by the optical sensor of the washing machine are inputted into the fuzzy inference computing portion 3.

Step d3

In the fuzzy inference computing portion 3, the fuzzy inference operation is effected using the changes x1, the saturation time x2 in the transmission factor of the washing water so as to obtain the washing time $y^*$. The operation procedure of the fuzzy inference is the same as the step a3 in the first embodiment.

Step d4

The washing time y* which is the output of fuzzy inference is displayed for the user by the output of fuzzy inference display portion 31. The user inputs the correction amount from the user input portion 32 in accordance with one's preferences with respect to the washing time y* which is the output of fuzzy inference. For example, when considerably dirty clothes are washed, the washing time is displayed as 10 minutes by the fuzzy inference. When the user considers it better to wash them longer than the value, the user inputs the difference between the desired washing time and the displayed washing time into the user input portion 32 so as to set the longer washing time. The user input portion 32 outputs the correction amount y'. Unless the user adds the change with respect to the displayed output of fuzzy inference, the correction amount y' is 0.

Step d5

The descent method computing portion 5 determines whether or not the correction amount y' which is the output from the user input portion 32 is 0. If the correction amount y' is 0, it is considered that the fuzzy inference rule which has developed the output of fuzzy inferences expresses the user's desire. The process moves to step d2 without tuning of the inference rule so as to wait for the sensor input when a next washing starts. If the correction amount is not 0, the process moves into the step d6.

Steps d6, d7

In the descent method computing portion 5, the correction amount y' is added to the output of fuzzy inference y* into $y^r$. The correction amount $y^r$ and the input data x1, x2 are assumed into one input/output data, and the tuning operation of the membership function is effected by the descent method. The computation of the tuning is the same as the steps a4, a5 in the first embodiment. After the renewing of the membership function, the process returns to the step d2 so as to wait for the sensor input at the next washing starting time.

According to the present embodiment, the results of the fuzzy inference is shown for the user by the output of fuzzy inference display portion 31. The user's desire with respect to the result is inputted from the user input portion 32 so as to change the membership function of the fuzzy inference with the use of the descent method. An appliance which is capable of controlling the operation thereof in accordance with the user's desire may be realized if it is used again.

Other appliances may be used although the description is effected of a washing machine in the embodiment. Although the construction of a portion for effecting the automatic tuning operation is made similar to that of the first embodiment, the construction of the second embodiment may be used in this portion. In this case, the consequent part of the inference rule becomes a real number, and the merits of a second invention in which the tuning is effected at a higher speed and so on may also be realized.

Figure 11:
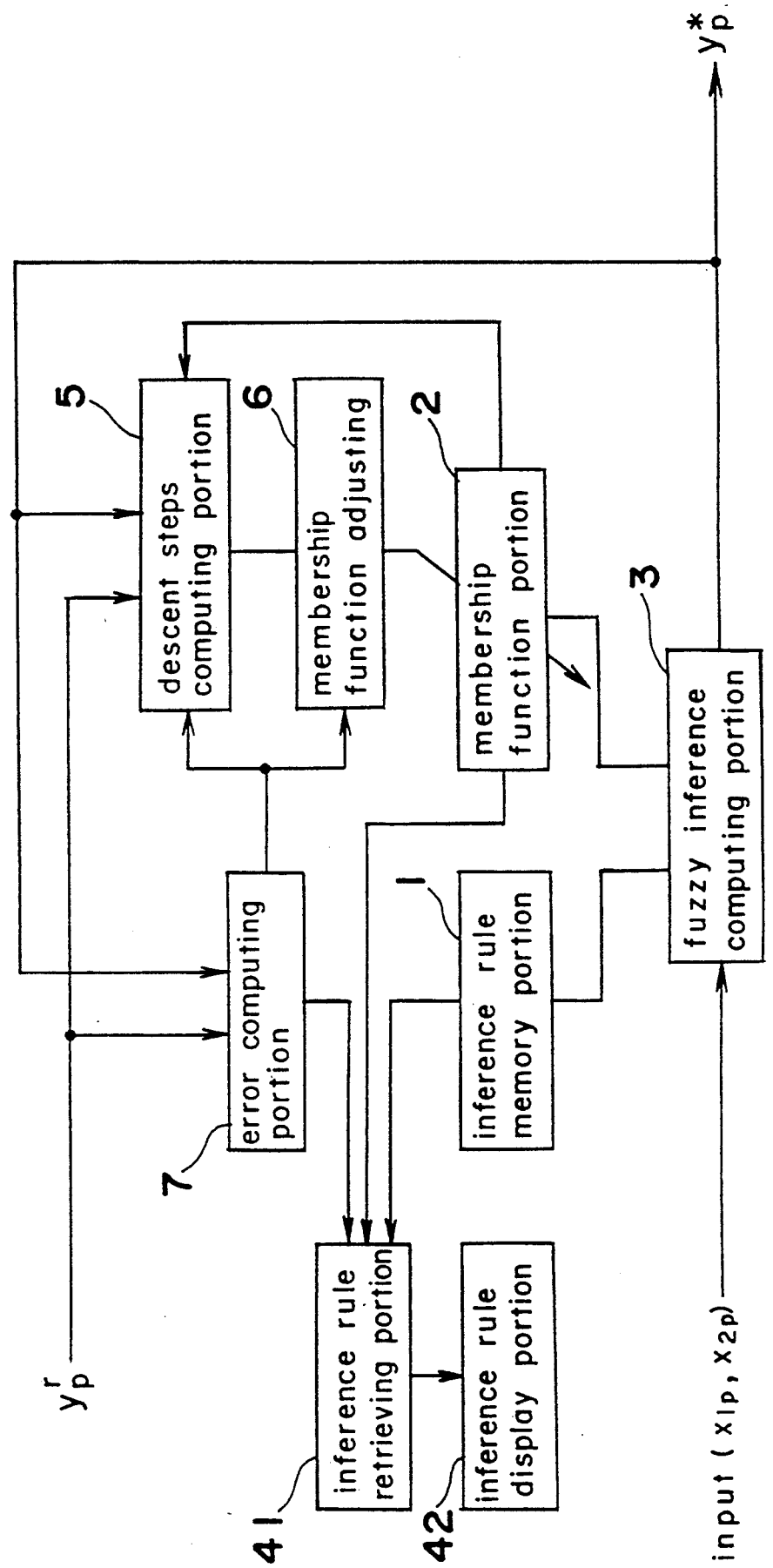
FIG. 11 is a block diagram of a fuzzy inference apparatus in a fifth embodiment of the invention.

The fifth embodiment of the invention will be described. The block diagram of the fuzzy inference apparatus of the fifth embodiment is shown in FIG. 11, which includes an inference rule memory portion 1 having the inference rules of the fuzzy inference stored therein, a membership function memory portion 2 having the geometric data of the membership functions of the antecedent part to be used in the fuzzy inference and the function formula of the consequent part stored therein, a fuzzy inference computing portion 3 for effecting the computing operation for the fuzzy inference, a descent steps computing portion for obtaining the tuning direction by the descent method from the input/output data to be obtained from the specialists and the output of fuzzy inferences, a membership function adjusting portion 6 for renewing the membership functions in accordance with the computation results of the descent steps computing portion 5, and an error computing portion 7 for computing the inference error from the fuzzy output of fuzzy inferences and the input/output data. The above description is similar to the construction of FIG. 1. The difference in the construction of FIG. 1 and FIG. 11 is that FIG. 11 has an inference rule retrieving portion 41 for retrieving the inference rule memory portion 1 and the membership function memory portion 2 so as to obtain an inference rule which is larger in adaptation range, and an inference rule display portion 42 for displaying the inference rule obtained by the inference rule retrieving portion 31.

The operation of the fuzzy inference apparatus in a fifth embodiment will be described hereinafter.

In the first embodiment, the construction of the membership function of the fuzzy inference is automatically effected and the knowledge of the specialists can be obtained as the inference rules. When significant noises are included in the input/output data to be obtained from the specialists, the tuning may be advanced in an unexpected direction. Also, when tuning is conducted so as to minimize the inference error for input/output data given previously, the inference error for new data not given at the tuning time may become large. In order to avoid such a condition, the designer and the user have to understand and check the inference rules and the membership functions constructed automatically.

In order to solve these problems, the inference rule obtained by the automatic tuning will be displayed. In order to efficiently check the inference rules, the inference rule in which the adaptation range is wide will be displayed first.

Figure 2:
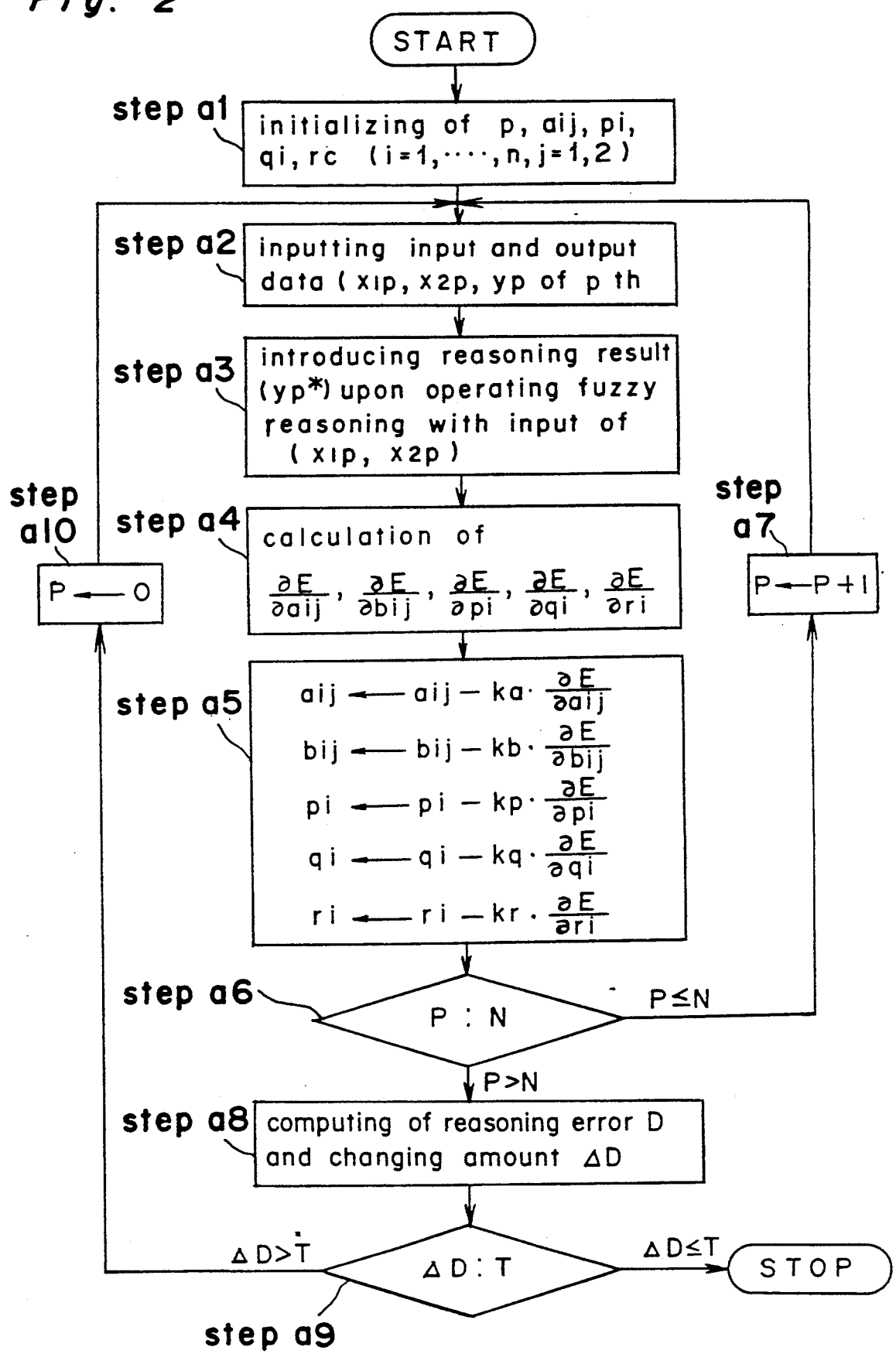
FIG. 2 is a flow chart showing the operation of the embodiment.

The operation procedure of the automatic tuning is similar to the flow chart of FIG. 2 in the first embodiment. The different portion is in that the inference rule is displayed after the tuning completion. The inference rule retrieving portion 41 retrieves the membership function memory portion 2, after the tuning completion, so as to effect the operation of the following formula.

$$Si = \prod_{j=1}^{2} bij \qquad (25)$$

$$(i = 1, \ldots, n)$$

wherein Si shows the width of the adaptation range of the inference rule Ri. The inference rule Ri, the geometry of the membership functions, and the parameters of the function formula of the consequent part are sent to the inference rule displaying portion 42 in the size order of Si.

The inference rule display portion 42 is composed of a CRT and its control apparatus so as to display the inference rule sent from the inference rule retrieving portion 41, the information such as membership functions and so on.

According to the present embodiment, the fuzzy rule obtained by the descent method may be displayed in the order of the width of the adaptation range. Therefore, the user can grasp the inference rule obtained by the automatic tuning operation, thus allowing the advancing condition of the tuning and the inference rule to be checked.

Although the CRT is used as the inference rule displaying portion 42 in the embodiment, a light emitting diode display, liquid crystal display and so on may be used. Also, although the construction of the portion for effecting the automatic tuning operation is made similar to that of the first embodiment, the construction of the second embodiment may be used in this portion. In this case, the consequent part of the inference rule becomes real numbers, the tuning speed increases, and so on, thus realizing the merits of the second embodiment.

Figure 12:
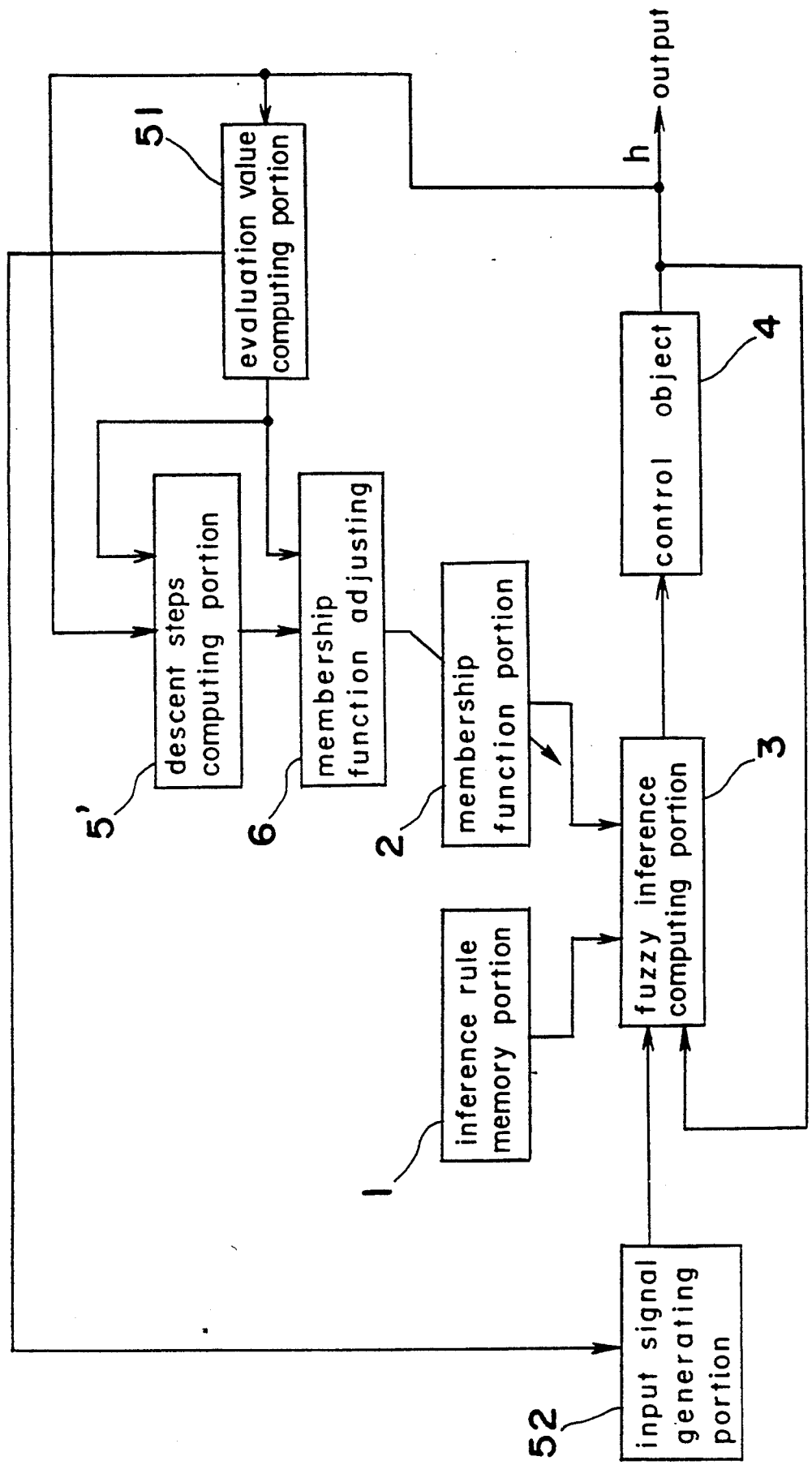
FIG. 12 is a block diagram of a fuzzy inference apparatus in a sixth embodiment of the invention.

The sixth embodiment of the invention will be described. FIG. 12 shows a block diagram of the fuzzy inference apparatus of the sixth embodiment. In FIG. 12, reference numeral 1 is an inference rule memory portion having the inference rules of the fuzzy inference stored therein, reference numeral 2 is a membership function memory portion having a membership function of the antecedent part to be used in the inference rules and the function formula of the consequent part stored therein, reference numeral 3 is a fuzzy inference computing portion for effecting the computing operation of the fuzzy inference, reference numeral 4 is a control object, reference numeral 6 is a membership function adjusting portion for renewing the membership functions in accordance with the computing results of the descent steps computing portion 5', which are similar in construction to FIG. 1. The difference in construction between FIG. 1 and FIG. 12 is that FIG. 12 has an evaluation value computing portion 51 for computing the evaluation value from the observation value h from the control object, an input signal generating portion 52 for generating the step shaped input signal, and a descent steps computing portion 5' for computing by the descent steps from the observation value h of the control object 4 so as to obtain the tuning direction.

The operation of the fuzzy inference apparatus in a sixth embodiment will be described hereinafter.

Conventionally, the construction of the fuzzy inference rules and the designing of the membership functions are effected through interviews with specialists and the accumulation of trial and error experiments. Therefore, the fuzzy inference has problems in that a long period is required to describe the inference rules, and optimum designing is hard to achieve. The present invention is to effect the automatic tuning (adjusting) of the fuzzy inference so as to optimize the objective functions the designer optionally sets. Unlike the first embodiment, the present embodiment does not need the input/output data from the specialists.

Figure 13:
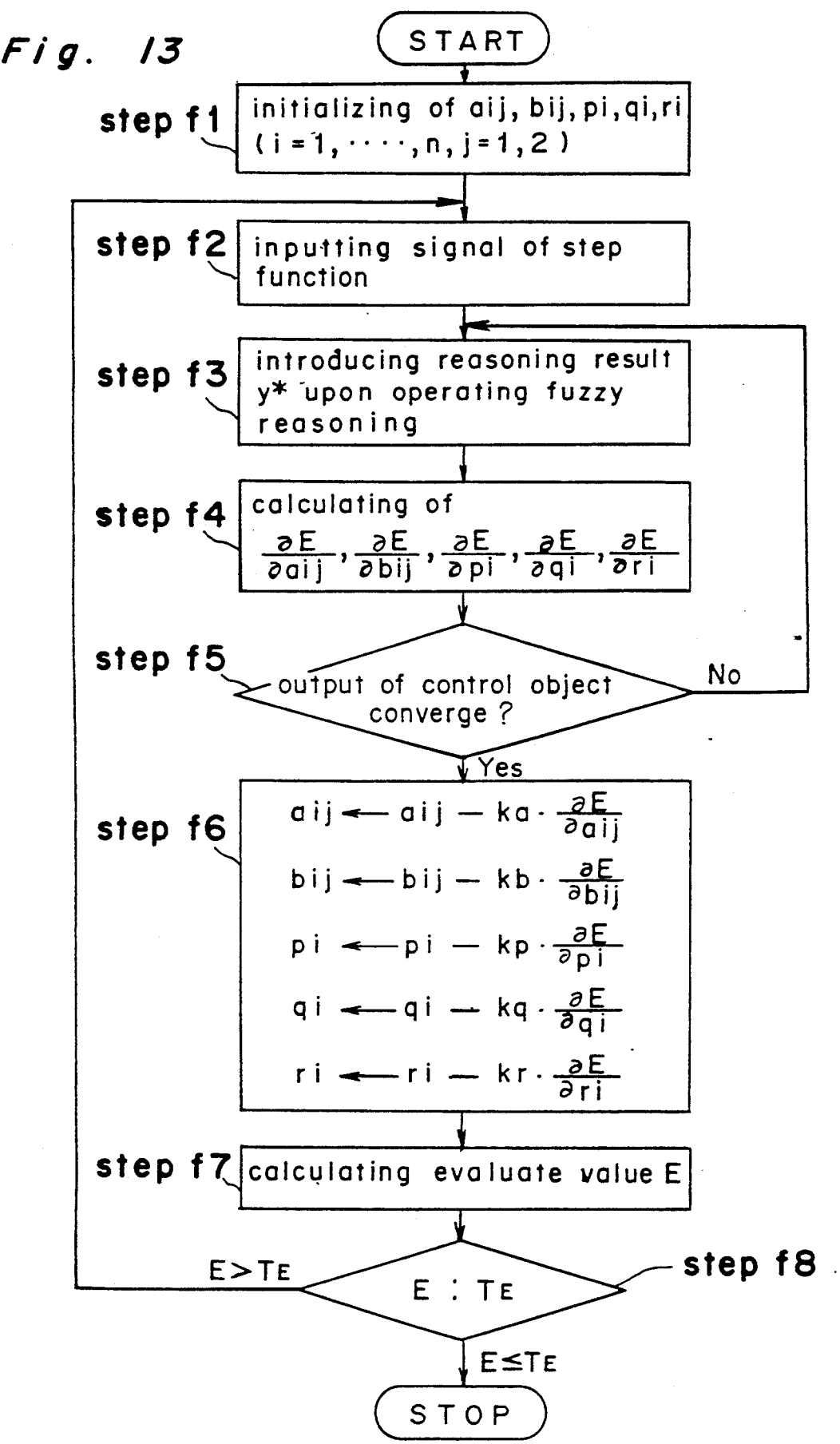
FIG. 13 is a flow chart showing the operation of the embodiment.

Using the two-input one-output control system as an example, the detailed operation procedure in the present embodiment will be described with the use of the flow chart of FIG. 13.

Step f1

In the present embodiment, the inference rule memory portion 1, the membership function memory portion 2, the fuzzy inference operation portion 3 are similar in construction to those in the first embodiment. The inference rules and the membership functions are similar in construction. At the step f1, the initiation of the membership functions is also effected as at the (step a1) of the first embodiment.

Step f2

Figure 14A:
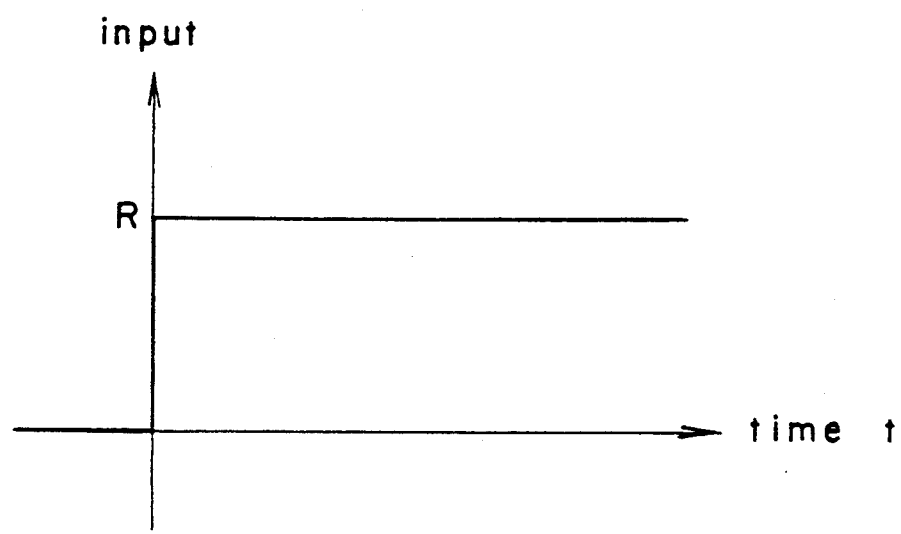
FIGS. 14(a) and (b) are illustrating charts of an objective function.

Such a step function as described in FIG. 14(a) is inputted into the fuzzy inference computing portion 3 by the input signal generating portion 52. R in the drawing is a control target value.

Step f3

The fuzzy inference is effected as in the (step a3) of the first embodiment.

Step f4

The objective function E in the automatic tuning is set as follows so as to compute the value thereof by the objective function operation portion 51.

$$E = \int (h(t) - R)^2 \, dt \tag{26}$$

wherein R is a target value, t is time.

Figure 14B:
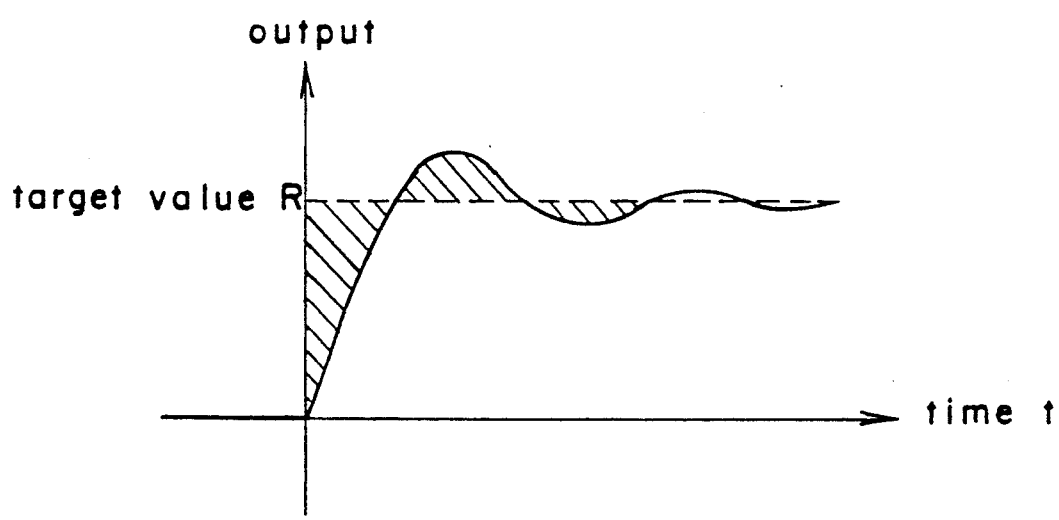
Figure 15:
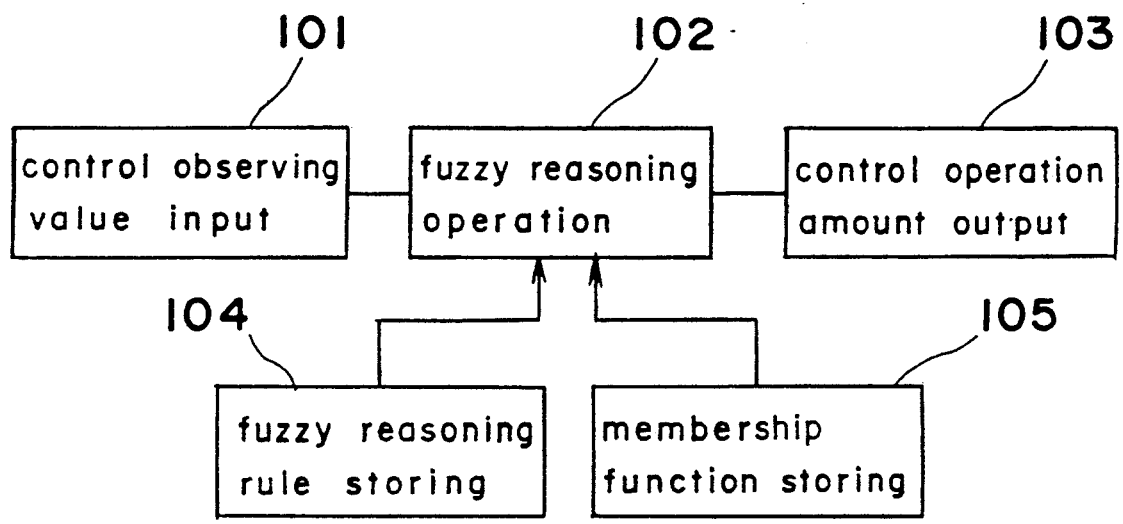
FIG. 15 is a block diagram of the conventional fuzzy inference apparatus.
Figure 16:
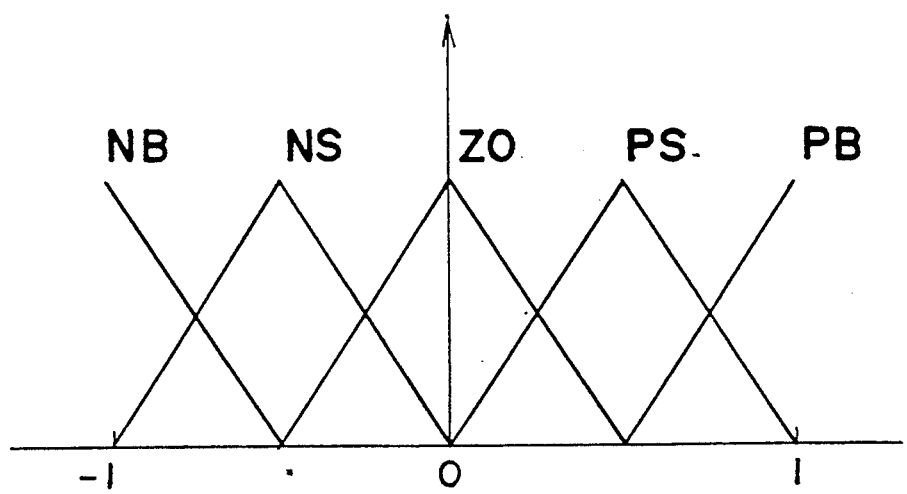
FIG. 16 is a construction chart of a membership function.

FIG. 14(b) shows a response of the output h(t) with respect to the step input with the horizontal axis being time. The value E of the above described formula shows the area of the oblique line portion of FIG. 11(b), is called integral of squared error (ISE). ISE is a kind of performance index of tranjent response. The value of ISE becomes larger when the response is slow and the steady state error exists. Accordingly, when the ISE is small in value, the desirable control is effected.

In the present embodiment, the automatic tuning is effected so as to minimize E with the use of the descent method, with the objective function E being provided as ISE.

Although the objective function is made ISE in the present embodiment, other indexes such as ITAE (integral of time-multiplied absolute value of error), rise time, overshoot amount and so on may be used.

In order to effect the tuning for minimizing the objective function, the steepest descent method which is one technique among the descent methods in the present invention is used. In the steepest descent method, the tuning parameter is renewed in accordance with the differential value of the objective function. As in the first embodiment, the differential value of the objective function by the tuning parameter is computed. Now the differential value of the differential function by the value ri is obtained.

$$\frac{\partial E}{\partial ri} = \int \frac{\partial}{\partial ri} ((h(t) - R)^2) dt = \int 2 \cdot (h(t) - R) \cdot \frac{\mu i}{\sum\limits_{k=1}^{n} \mu k} dt \tag{27}$$

At the step f4, the following computing operation is effected so as to obtain the above described value $\partial E/\partial ri$ by the descent method computing portion 5.

$$\frac{\partial E}{\partial ri} <= \frac{\partial E}{\partial ri} + 2 \cdot T \cdot (h(t) - R) \cdot \frac{\mu i}{\sum\limits_{k=1}^{n} \mu k} \tag{28}$$

wherein T is sample time.

The computing operation is repeated until h(t) is converged by the following step f5, and the value ∂E/∂ri is obtained.

Likewise, the computing operations of the other values ∂E/∂aij, ∂E/∂bij, ∂E/∂pi, ∂E/∂qi are also effected in the descent method computing portion 5.

Step f5

The evaluation value computing portion 5 decides whether or not the output h(t) from the control object is converged on the target value. This operation is effected by the following conditional formula.

$$|h(t) - R| < 0.05 * R \tag{29}$$

Unless the condition is satisfied, the step f3 is restored.

Step f6

As in the step a5 in the first embodiment, from the computed ∂E/∂aij, ∂E/∂bij, ∂E/∂pi, ∂E/∂qi, ∂E/∂ri, the tuning parameters aij, bij, pi, qi, ri, which are accommodated in the membership function memory portion 2 are renewed with the use of the membership function adjusting portion 6.

Step f7

By the evaluation value computing portion 51, the evaluation value E is obtained in accordance with the formula (26).

Step f8

By the evaluation value computing portion 51, the value E is compared with the given threshold value $T_E$. When the evaluation value E is larger than the threshold value $T_E$, it is judged that sufficient tuning has not yet been effected. The process returns to a step f2 so as to repeat the steps f2 through f7. When the evaluation value E has become smaller than the threshold value $T_E$, it is judged that the fuzzy inference rules which possess sufficiently good control properties have been obtained, then ceases the operations of the decent steps computing portion 5' and the membership function adjusting portion 6.

According to the present embodiment, the fuzzy inference rules which are provided to optimize the value ISE can be automatically produced by the descent method. Accordingly, such an appliance controlling operation as to automatically make the objective function optimum can be effected.

In this embodiment, other geometries of membership functions can be used although the geometry of the membership functions of the antecedent part is a triangle type. Although the decent method used by the descent steps computing portion 5, is the steepest descent method, the Newton method, the conjugate gradient method, the Powell method and so on may be used.

As is clear from the foregoing description, according to the arrangement of the present invention, the optimum inference rules can be obtained by the descent method. Therefore, the specialists' knowledge and know-how can be easily mounted on the appliances as the inference rules.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A fuzzy inference system comprising:
   a controlled machine for operating in accordance with control input values and for producing control observation values responsive to an operation thereof; and,
   a fuzzy inference apparatus, coupled to said controlled machine, including
   (a) an inference computing portion for effecting a fuzzy inference operation based on the control input values and corresponding control observation values of said controlled machine so as to generate an operation amount with respect to said controlled machine,
   (b) an inference rule memory portion for storing inferences rules used in said inference computing portion,
   (c) a membership function memory portion for storing geometric data of membership functions of antecedent parts and functions of consequent parts of each inference rule used in said inference computing portion,
   (d) a descent method computing portion for effecting a descent method computing operation according to input/output data provided in advance and the operation amount generated by said inference computing portion,
   (e) a membership function adjusting portion for varying at least one of the membership functions of the antecedent parts and the functions of the consequent part stored in said membership function memory portion in accordance with an output of said descent method computing portion,
   (f) an error computing portion for computing an inference error from the input/output data and the operation amount generated by said inference computing portion, and for ceasing operations of said descent method computing portion and said membership function adjusting portion when at least one of the inference error and a change in the inference error satisfies a predetermined condition.

2. A fuzzy inference system comprising:
   a controlled machine for operating in accordance with control input values and for producing control observation values responsive to an operation thereof; and,
   a fuzzy inference apparatus, coupled to said controlled machine, including
   (a) an inference computing portion for effecting a fuzzy inference operation based on the control input values and corresponding control observation values of said controlled machine so as to generate an operation amount with respect to said controlled machine,
   (b) an inference rule memory portion for storing inferences rules used in said inference computing portion,
   (c) an antecedent part memory portion for storing parameters denoting a geometry of membership functions of antecedent parts of each inference rule used in said inference computing portion,
   (d) a consequent part memory portion for storing real numbers of membership functions of consequent parts of each inference rule used in said inference computing portion, (e) an antecedent part descent method computing portion for effecting a descent method computing operation with respect to the parameter denoting the geometry of the membership functions of the antecedent parts from input/output data provided in advance and the operation amount generated by said inference computing portion, (f) an antecedent part parameter adjusting portion for varying at least one of parameters denoting the geometry of the membership functions of the antecedent parts stored in said antecedent part memory portion in accordance with an output of said antecedent part descent method computing portion, (g) a consequent part descent method computing portion for effecting a descent method computing operation with respect to the real numbers of the consequent parts from the input/output data provided in advance and the operation amount generated by said inference computing portion, (h) a consequent part real number adjusting portion for varying at least one of the real numbers of the consequent parts stored in said consequent part real number memory portion in accordance with an output of said consequent part descent method computing portion, (i) an error computing portion for computing an inference error from the input/output data and the operation amount generated by said inference computing portion, and for ceasing operations of said antecedent part descent method computing portion, said consequent part descent method computing portion, said antecedent part parameter adjusting portion and said consequent part real number adjusting portion when at least one of the inference error and a change in the inference error satisfies a predetermined condition.

3. A fuzzy inference system comprising:
a controlled machine for operating in accordance with a total operation amount and for producing control observation values responsive to an operation thereof;
a controller for generating a first operation amount of the controlled machine in accordance with control input values and the observation values of said controlled machine;
a differential computing portion for obtaining a differential amount of the control input values;
a fuzzy inference apparatus, coupled to said controller and to said differential computing portion, including (a) an inference computing portion for effecting a fuzzy inference operation based on the control input values and the corresponding differential amount so as to generate a second operation amount with respect to said controlled machine, (b) an inference rule memory portion for storing inferences rules used in said inference computing portion, (c) a membership function memory portion for storing membership functions of antecedent parts and functions of consequent parts of each inference rule used in said inference computing portion, (d) a descent method computing portion for effecting a descent method computing operation according to the first operation amount generated by said controller and the second operation amount generated by said inference computing portion, (e) a membership function adjusting portion for varying at least one of the membership functions of the antecedent parts and the functions of the consequent parts stored in said membership function memory portion in accordance with an output of said descent method computing portion; and, an operation amount adding portion, coupled to said controller and to said fuzzy inference apparatus and to said controlled machine, for adding the first and second operation amounts respectively generated by said controller and said fuzzy inference apparatus and for applying a thus obtained total operation amount to said controlled machine.

4. A fuzzy inference system comprising:
a controlled machine for operating in accordance with control input values and for producing control observation values responsive to an operation thereof; and,
a fuzzy inference apparatus, coupled to said controlled object, including (a) an inference computing portion for effecting a fuzzy inference operation based on the control input values and corresponding control observation values of said controlled machine so as to generate an operation amount with respect to said controlled machine, (b) an inference rule memory portion for storing inferences rules used in said inference computing portion, (c) a membership function memory portion for storing geometric data of membership functions of antecedent parts and functions of consequent parts of each inference rule used in said inference computing portion, (d) a user input portion for inputting user preferences with respect to the operation amount generated by said inference computing portion, (e) a descent method computing portion for effecting a descent method computing operation according to the user preferences input by said user input portion and the operation amount generated by said inference computing portion, (f) a membership function adjusting portion for varying at least one of the membership functions of the antecedent parts and the functions of the consequent parts stored in said membership function memory portion in accordance with an output of said descent method computing portion, (g) an error computing portion for computing an inference error from input/output data provided in advance and the operation amount generated by said inference computing portion, and for ceasing operations of said descent method computing portion and said membership function adjusting portion when at least one of the inference error and a change in the inference error satisfies a predetermined condition.

5. A fuzzy inference system comprising:
a controlled machine for operating which operates in accordance with control input values and for producing control observation values responsive to an operation thereof; and,
a fuzzy inference apparatus, coupled to said controlled object, including (a) an inference computing portion for effecting a fuzzy inference operation based on the control input values and corresponding control observation values of said controlled machine so as to generate an operation amount with respect to said controlled machine, (b) an inference rule memory portion for storing inferences rules used in said inference computing portion, (c) a membership function memory portion for storing geometric data of membership functions of antecedent parts and functions of consequent parts of each inference rule used in said inference computing portion, (d) a descent method computing portion for effecting a descent method computing operation according to input/output data provided in advance and the operation amount generated by said inference computing portion, (e) a membership function adjusting portion for varying at least one of the membership functions of the antecedent parts and the functions of the consequent parts stored in said membership function memory portion in accordance with an output of said descent method computing portion, (f) an error computing portion for computing an inference error from the input/output data and the operation amount generated by said inference computing portion, and for ceasing operations of said descent method computing portion and said membership function adjusting portion when at least one of the inference error and a change in the inference error satisfies a predetermined condition, and (g) an inference rule display portion for retrieving the inference rules stored in said inference rule memory portion and the membership functions stored in said membership function memory portion and for displaying the inference rules including the membership functions.

6. A fuzzy inference system comprising:

a controlled machine for operating in accordance with control input values and for producing control observation values responsive to an operation thereof; and, a fuzzy inference apparatus, coupled to said controlled object, including (a) an inference computing portion for effecting a fuzzy inference operation based on the control input values and corresponding control observation values of said controlled machine so as to generate an operation amount with respect to said controlled machine, (b) an inference rule memory portion for storing inferences rules used in said inference computing portion, (c) a membership function memory portion for storing geometric data of membership functions of antecedent parts and functions of consequent parts of each inference rule used in said inference computing portion, (d) a descent method computing portion for effecting a descent method computing operation according to the operation amount generated by said inference computing portion, (e) a membership function adjusting portion for varying at least one of the membership functions of the antecedent parts and the functions of the consequent parts stored in said membership function memory portion in accordance with an output of said descent method computing portion, (f) an evaluation value computing portion for obtaining an evaluation value denoting a control property of said controlled machine from the observation values of said controlled machine, and for ceasing operations of said descent method computing portion and said membership function adjusting portion when the evaluation value satisfies a predetermined condition.

* * * * *